United States Patent [19]

Reynolds

[11] 4,217,120

[45] Aug. 12, 1980

[54] AIR-OIL SEPARATOR FOR AIRCRAFT GEARBOX

[75] Inventor: Richard W. Reynolds, Ames, Iowa

[73] Assignee: Sundstrand Corporation, Rockford, Ill.

[21] Appl. No.: 844,014

[22] Filed: Oct. 20, 1977

[51] Int. Cl.² ............................................. B01D 50/00
[52] U.S. Cl. ................................... 55/385 R; 55/409
[58] Field of Search .................... 55/409, 408, 385 R; 210/377; 184/6.12, 6.23

[56] References Cited

U.S. PATENT DOCUMENTS

| | | | |
|---|---|---|---|
| 2,779,435 | 1/1957 | Hoeltje | 55/409 |
| 2,818,047 | 12/1957 | Powell | 55/409 X |
| 2,888,097 | 5/1959 | Scheffler | 184/6.23 |
| 2,949,977 | 8/1960 | Klompas | 55/409 |
| 3,378,104 | 4/1968 | Venable | 55/409 X |
| 3,415,383 | 12/1968 | Earle et al. | 55/408 X |
| 3,712,032 | 1/1973 | Obligado | 55/409 |
| 4,049,401 | 9/1977 | Smith | 55/409 X |

FOREIGN PATENT DOCUMENTS 709646 6/1954 United Kingdom .................... 55/409

Primary Examiner—David H. Brown
Attorney, Agent, or Firm—Ted E. Killingsworth; Michael B. McMurry

[57] ABSTRACT

In a gearbox for an aircraft, a multiple stage separator is attached to a gear journaled within the gearbox housing. An axial bore extends at least partially through the shaft supporting the gear and opens into a discharge chamber which communicates with an atmospheric vent. A first stage of the separator includes an impeller attached to one face of the gear and a second stage includes a series of angularly spaced passages extending in a generally radial direction through the shaft to communicate with the bore. A sleeve telescoped into a reduced section of the inner end of the bore receives the incoming mixture of air and oil and directs the air into an enlarged outer end section of the bore wherein final stage separation of air and oil occurs. A member including an aperture concentric with the central axis of the bore keeps the oil collected along the walls of the bore from entering into the discharge chamber. A passage defined by a flat formed on the outside of the sleeve provides a flow path in a direction away from the discharge chamber for the collected oil to exit the bore back to the interior of the housing.

11 Claims, 4 Drawing Figures

AIR-OIL SEPARATOR FOR AIRCRAFT GEARBOX

BACKGROUND OF THE INVENTION

The present invention relates to a device for use in the gearbox of an aircraft to help keep oil within the gearbox from leaking out into the atmosphere. During operation of the aircraft, pressures may build up within the gearbox. If these pressures are allowed to build up in excess, they may interfere with the normal operation of the various components of the gearbox. Accordingly, a vent usually is provided from the gearbox to relieve interior pressures.

SUMMARY OF THE INVENTION

The primary aim of the present invention is to provide a unique separator for use within the gearbox to separate oil from the air in the interior of the gearbox so that oil-free air may be vented into the atmosphere to thereby avoid the loss of oil from the gearbox and pollution of the atmosphere. A more specific object is to utilize the centrifugal forces generated by rotation of one of the gears in the gearbox to separate the oil and air through a series of first, second and third stages of separating, each successive stage tending to separate smaller particles of oil from the air.

A more detailed object is to construct the separator with the first and second stages of separating occuring as mixed air and oil flows radially inward toward the rotational axis of the gear.

The invention also resides in the novel construction of the separator to include a plurality of generally radial passages connected with an unique sleeve which separates at least one of the passages from the others so that the separated passage provides an outlet for the oil collected from the air.

Additional novel features of the present invention resides in the provision of an impeller as a first stage of the separator and in the mounting of the impeller on the gear.

These and other objects and advantages of the present invention will become more apparent from the following detailed description when taken in conjunction with the accompanying drawings.

DETAILED DESCRIPTION OF THE PREFERRED EMBODIMENT

Figure 1:
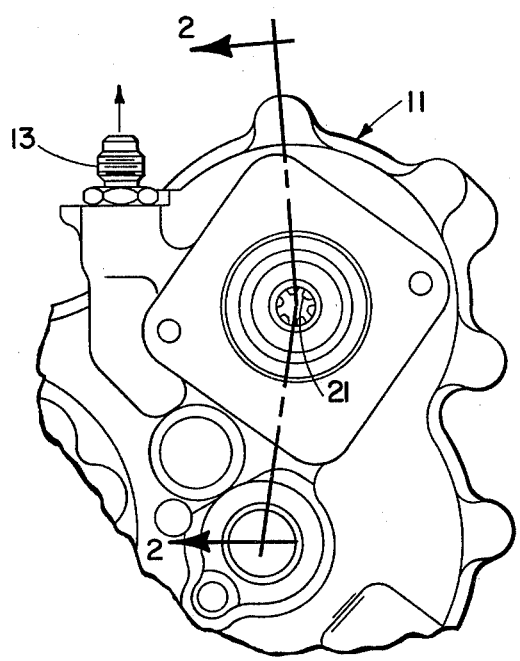
FIG. 1 is a fragmentary view of a portion of an aircraft gearbox within which is mounted an air-oil separator embodying the novel features of the present invention.

As shown in the drawings for purposes of illustration, the present invention contemplates the provision of an unique air-oil separator 10 in a gearbox of an aircraft so that oil-free air may be discharged from the gearbox and back into the atmosphere to avoid both losing oil from the gearbox and pollution of the atmosphere. The present invention is suited particularly for use in a gearbox such as one which is powered by a turbine engine wherein an air-buffered labyrinth seal (not shown) may be provided between the engine and the gearbox. Such seals are particularly designed to vent a considerable flow of air from the engine into the interior of the gearbox both for sealing and lubrication purposes. As a result, it is necessary to provide a vent 13 from the gearbox housing 11 to avoid a build up of back pressure within the housing. Such pressure, of course, would interfere with the expected operation of the air-buffered labyrinth seal.

Figure 2:
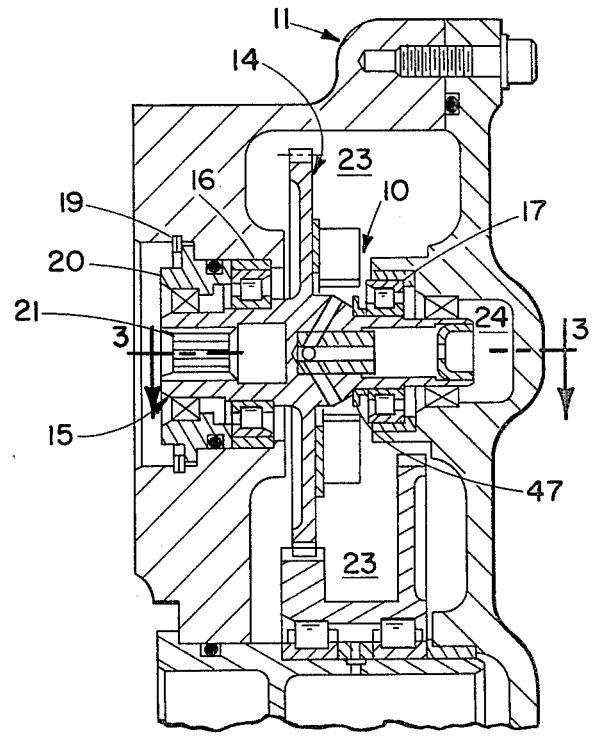
FIG. 2 is an enlarged cross-sectional view taken substantially along line 2—2 of FIG. 1.

As the air flows through the gearbox housing 11, a certain amount of oil naturally becomes entrained with the air and it is desirable that this oil be separated from the air before the air is vented from the housing. In order to separate the oil from the air, the separator 10 is of the type utilizing centrifugal forces to separate the heavier oil from the lighter air. Herein, the separator is mounted on one side of a gear 14 (see FIG. 2) and the gear includes a central hub 18 with an integrally formed shaft 15 extending axially from the opposite sides thereof. The shaft is suitably supported by bearings 16 and 17 within a chamber 23 defining a portion of the interior of the housing. A clip ring 19 is seated within a groove in the housing 11 and abutts a retaining collar 20 which in turn engages the outer race member of the bearing 16 so as to keep the gear 14 from moving in an axial direction to the left as shown in FIG. 2. Power to the gear is provided through the splined end 21 of the shaft 15 which may be drivingly connected to the aircraft engine (not shown).

When the aircraft engine is in operation driving the gear 14, pressure greater than atmospheric builds up within the chamber 23 and because of the high speed rotating gears within the gearbox, oil becomes entrained with the air in chamber 23. As previously mentioned, to keep the back pressure from building up within the chamber 23 to an extent that the efficiency of the air-buffered labyrinth seal is affected, the present invention contemplates the provision of the separator 10 to include at least first and second stages for separating the oil from the air. More particularly, in venting the air from the chamber 23, passages are provided both laterally and axially through the shaft 15 for directing the air to a discharge chamber 24 communicating with the vent 13. In one stage of the separator, lateral or generally radial passages 25 are formed through the shaft 15 and intersect with a bore 26 which extends in an axial direction partially through the shaft 15. The bore 26 communicates with the chamber 24 and a member 27 is provided within the bore 26 to keep the oil from flowing along the sides of the bore and into the discharge chamber 24. An additional passage 29 extends laterally, in a generally radial direction, through the shaft 15 and includes an inlet 30 particularly positioned to receive the oil collected within the bore 26 so as to direct the separated oil away from the discharge chamber and back into the chamber 23. In this way, oil-free air may be vented from the gearbox housing thereby avoiding loss of oil from the housing and pollution of the atmosphere.

Figure 4:
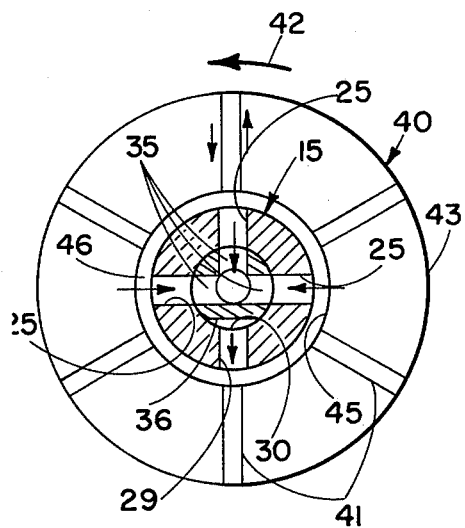
FIG. 4 is a view taken substantially along line 4—4 of FIG. 3.

In the present instance, one stage of the separator is uniquely defined by three angularly spaced inlet passages 25 which are formed laterally through the shaft 15. Herein, for ease in machining, the passages 25 are slanted away from the gear 14 upon progressing radially outward from the bore 26. As shown in FIG. 4, two of the inlet passages 25 are located diametrically of each other while the other inlet passage is positioned diametrically of the outlet passage 29.

Figure 3:
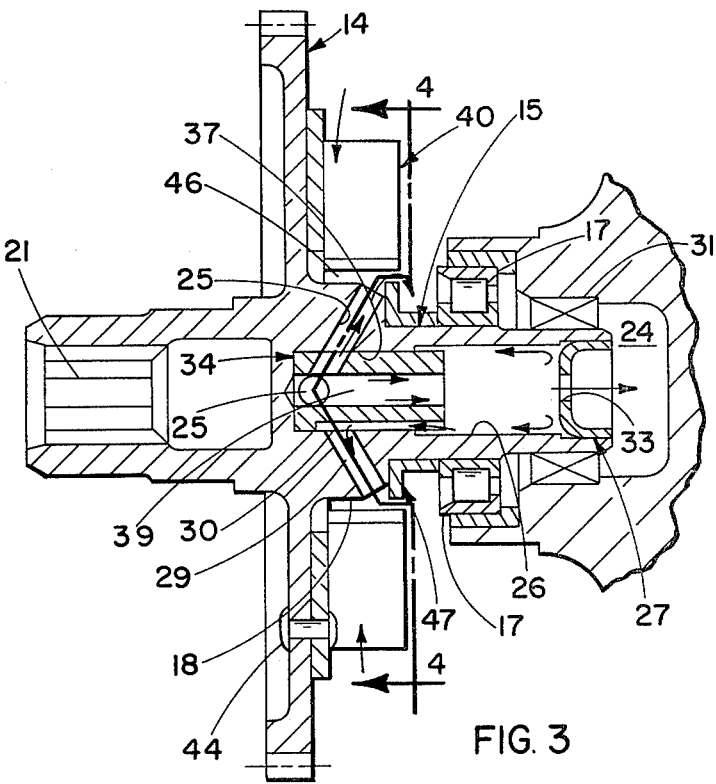
FIG. 3 is an enlarged cross-sectional view substantially along line 3—3 of FIG. 2.

As shown in FIG. 3, the radially inward ends of the passages 25 communicate with the bore 26 which herein extends axially relative to the shaft 15. As the shaft rotates and pressure builds up within the chamber 23, the air and oil mixture begins to flow toward the lower pressure air outside the vent 13. More particularly, the air-oil mixture flows through the passage 25, the axial bore 26 and into the discharge chamber 24 before exiting the vent 13. In one stage of separation because of the greater mass weight of oil over that of air, the oil resists flowing rapidly inward to a greater degree than the air and some of the oil collects on the side walls of the passages 25 and is slung back into the chamber 23. In an additional stage of separation, oil which is carried by the air into the bore 26 is slung radially outward toward the sides of the bore 26 by the rotating shaft 15 as the air flows in an axial direction toward the discharge chamber 24. In this way, oil collects along the side walls of the bore. Adjacent the outlet of the bore into the chamber 24 the member 27 provides a restriction in the diameter of the bore so that only the air flowing generally along the rotational axis the gear is allowed to enter the chamber 24, this air being virtually free of oil.

From the discharge chamber 24, a suitable passage (not shown) communicates with the vent 13 so that the air in the chamber 24 may flow out the vent into the atmosphere. To keep the air from flowing back into the interior chamber 23, a seal 31 is located between the shaft 15 and the housing 11 adjacent to the discharge passage 24. Thus, virtually all of the air entering the discharge chamber is directed out of the housing.

To make sure that essentially only air enters the discharge chamber 24, one form of simplified restriction for blocking the flow of oil along the walls of the bore 26 and into the chamber 24 is shown in FIG. 3 as a cup-shaped member 27. Herein, the cup-shaped member 27 includes a central aperture 33 concentric with the axis of the bore and having a diameter substantially smaller than the diameter of the bore. As a result of this construction, there is provided space within the bore radially outward of the aperture within which the centrifuged oil may accumulate before being discharged back into the interior chamber 23. To assure that the oil collected along the side walls of the bore 26 flows back into the interior chamber 23, the inlet 30 of the passage 29 advantageously is spaced radially outward of the aperture 33. By virtue of this arrangement, an excessive amount of oil is kept from accumulating within the bore to the point where it might flow through the aperture 33 and into the discharge chamber 24.

In summary of the operation of the separator as described thus far, it is seen that in one stage of separation, oil and air mixture is forced into the inlet passage 25 where the heavier oil may be slung back into the interior chamber 23. Then, the resulting mixture of finer oil and air flows axially along the bore another stage of separation occurs with the fine particles of oil being slung outwardly to collect along the walls of the bore 26 while the lighter air flows axially into the discharge chamber 24 through the aperture 33 in the cup-shaped member 27. The oil collects in the bore then enters the outlet passage 29 through the inlet 30 to that passage for eventual discharge back into the interior chamber 23.

As an aid to the last stage of air-oil separation, a novel sleeve 34 is telescoped into the inner end of bore 26 and includes three axially spaced holes 35 which register with the inlet passages 25 to provide communication between these passages and the interior of the sleeve. Additionally, an elongated flat 36 is formed on the outside of the sleeve diametrically of one of the holes 35 so that when the holes 35 are in registry with passages 25, the flat 36 is in registry with the inlet 30 of the passage 29. The flat extends in an axial direction to provide a passage between the sleeve and the space which is located radially outward of the aperture 33. In this way, the oil collected in the bore is free to flow along the passage defined by the flat and to the outlet passage 29.

More particularly, as shown in FIG. 3, the bore 26 includes a reduced diameter inner end section 37 and the sleeve 34 is telescopically received in this reduced section. The central opening of the sleeve is substantially smaller in diameter than the diameter of the outer end section of the bore 26 and the sleeve extends from the inward end of the bore for approximately one half the length of the bore thereby providing a reduced diameter passage 39 extending for a substantial length of the bore 26. The oil and air mixture exiting the reduced diameter passage 39 is further centrifuged upon entering the larger diameter bore by the rotating shaft 15.

In accordance with another important aspect of the present invention, for very high operational speeds of the gearbox, an initial stage of separation is provided by an impeller 40 attached to one face of the gear 14 adjacent the inlet passages 25 and outlet passage 29. Advantageously, the impeller 40 provides early stage separation of oil and air and is particularly effective at high speeds when the oil in the gearbox has been churned into foam by the rotating gears.

One form of the impeller 40 is shown in FIG. 4 to include a plurality of radially extending blades 41 extending edgewise in a generally axial direction from a ring-shaped base 43. When installed on the gear 14 such as by means of rivets 44 (see FIG. 3), a central opening 45 in the impeller is telescoped over the gear shaft 15. Herein, the central opening 45 is larger in diameter than the diameter of the shaft adjacent the impeller thereby providing a relatively confined space 46 surrounding the shaft inwardly of the inner ends of the impeller blades 41. When the shaft 15 is rotated in a counterclockwise direction as indicated by the arrow 42 in FIG. 4, there is a build up of high pressure along the leading side of each blade 41 and a reduction in pressure along the trailing side of each blade. As a result, oil and air is drawn inwardly along the leading side of each blade toward the space 46 between the radially inward ends of the blades and the radially outward surface of the shaft 15. Being heavier, some of the oil separates from the air and flows radially outward along low pressure sides of the blades while another portion of the remaining mixture of oil and air is drawn into the inlet passages 25.

To avoid overloading of the two final stages of the separator 10, some oil is kept from entering the inlets to the passage 25 through the use of a slinger 47. The latter comprises a flanged collar sandwiched between the bearings 17 and the hub 18 of the gear 14. By virtue of this construction, a substantial amount of oil flowing along the impeller and toward the bearing 17 for lubrication purposes is kept from entering the space 46 and the passages 25 by utilizing the radial face of the slinger to throw oil collecting thereon away from the passage 25. Moreover, with the radially outward edge of the slinger flange spaced slightly inwardly of the inner ends of the impeller blades 41, the resulting gap provides a way for some oil collected in the space 46 to flow out of the separator.

In view of the foregoing, it will be seen that the present invention brings to the art a new and improved multi-stage separator 10 particularly adapted for use in the high-speed gearbox of an aircraft to effectively separate oil from the air to be vented from the interior of the gearbox housing 11. For this purpose, the first stage of the separator includes the impeller 40 attached to one face of the gear 14 to provide for separation of larger particles of oil from the air. The second stage of the separator includes the three angularly spaced passages 25 opening into the central passage 39 of the sleeve 34 and, as the shaft 15 rotates, the lighter air moves toward the center of the shaft 15 while the heavier oil is slung outwardly in the passages 25 and back into the annular space 46. Upon reaching the outer end of the passage 39, oil is further separated from the air in a final stage with the oil collecting in the bore 26 radially outward of the aperture 33 of the cup-shaped member 27. From this space, the collected oil flows between the flat 36 and the reduced diameter inner end section 37 of the bore through the opening 30 of the discharge passage 29 and finally into the annular space 46. The oil-free air exhausted through the aperture 33 enters the discharge chamber 24 to eventually flow out of the discharge chamber to be vented into the atmosphere.

I claim:

1. In the gearbox housing of an aircraft, the combination of, a gear including a shaft projecting therefrom, said shaft being journaled within the housing, a multi-stage centrifugal separator including an impeller mounted on said gear for initially separating oil from air, second and third stage separating means including inlet passage means integrally formed with said shaft, an air discharge chamber communicating with said first passage means, and outlet passage means separate from said inlet passage means for directing the oil separated by said third stage separating means away from said discharge chamber and back to the interior of the housing.

2. In the gearbox housing of an aircraft, the combination of, a shaft journaled within the housing, a gear mounted on said shaft, a multi-stage centrifugal separator associated with said shaft and said gear including an impeller mounted on said gear, a generally radial inlet passage formed in said shaft, a bore in said shaft and communicating with the inner end of said inlet passage, a discharge chamber communicating with said bore and sealed from communication otherwise with the interior of said housing, means restricting the flow of oil along the walls of said bore into said discharge chamber, and an outlet passage having an inner end communicating with said bore to receive oil collected within the bore and to direct the oil back into the interior of the housing, said inner end of said outlet passage being spaced radially outward of the inner end of said inlet passage.

3. The combination as defined by claim 2 wherein said means for keeping collected oil from flowing into said discharge chamber comprises a restrictive member having a central aperture smaller in diameter than the diameter of said bore.

4. The combination as defined by claim 3 wherein said inner end of said outlet passage is spaced radially outward of said aperture.

5. In the gearbox housing of an aircraft, the combination of, a shaft journaled within the housing, a gear mounted on said shaft, a multi-stage centrifugal separator associated with said shaft and said gear including an impeller mounted on said gear, a generally radial inlet passage formed in said shaft, a bore in said shaft and communicating with the inner end of said inlet passage, a discharge chamber communicating with said bore and sealed from communication otherwise with the interior of said housing, means restricting the flow of oil along the walls of said bore into said discharge chamber, an outlet passage communicating with said bore to receive oil collected within the bore and to direct the oil back into the interior of the housing, said impeller including a central opening of predetermined diameter and being telescoped onto said shaft concentric with a rotational axis of said shaft, and a plurality of said inlet passages angularly spaced from each other and having inlet openings spaced radially inward of said impeller opening.

6. The combination as defined by claim 5 wherein said bore includes inner and outer end sections, said inner end section being of a lesser diameter than said outer end section, a sleeve telescoped into said inner end section and including a plurality of angularly spaced ports in registry with said inlet passages, a central passage in said sleeve extending concentric with the axis of said gear and having a diameter substantially smaller than the diameter of said outer section of said bore.

7. The combination as defined by claim 6 wherein said sleeve includes a flat formed on the outside surface thereof, a gap defined between said flat and the inside of said bore, said flat being in registry with said outlet passage.

8. In the gearbox housing of an aircraft, the combination of, a shaft journaled within the housing, a gear mounted on said shaft, a multi-stage centrifugal separator associated with said shaft and said gear including an impeller mounted on said gear, a generally radial inlet passage formed in said shaft, a bore in said shaft and communicating with the inner end of said inlet passage, a discharge chamber communicating with said bore and sealed from communication otherwise with the interior of said housing, means restricting the flow of oil along the walls of said bore into said discharge chamber, an outlet passage communicating with said bore to receive oil collected within the bore and to direct the oil back into the interior of the housing, said means for keeping collected oil from flowing into said discharge chamber comprising a restrictive member having a central aperture smaller in diameter than the diameter of said bore, and said outlet passage including an inlet opening spaced radially outward of said aperture.

9. The combination as defined by claim 8 wherein said restrictive member is generally cup-shaped.

10. In the gearbox housing of an aircraft, the combination of, a shaft journaled within the housing, a gear mounted on said shaft, a multi-stage centrifugal separator associated with said shaft and said gear including an impeller mounted on said gear, a generally radial inlet passage formed in said shaft, a bore in said shaft and communicating with the inner end of said inlet passage, a discharge chamber communicating with said bore and sealed from communication otherwise with the interior of said housing, means restricting the flow of oil along the walls of said bore into said discharge chamber, an outlet passage communicating with said bore to receive oil collected within the bore and to direct the oil back into the interior of the housing, and a slinger captivated on said shaft adjacent said inlet passages to keep an excessive amount of oil from entering said passages.

11. In the gearbox housing of an aircraft, the combination of, a rotatable shaft journaled within the housing and including an axially extending bore formed at least partially through the shaft, a plurality of angularly spaced passages extending in a generally lateral direction through the shaft and having inner ends communicating with the bore, a discharge chamber adjacent one end of said shaft and communicating with said bore, a vent to atmosphere communicating through said housing with said discharge chamber, means between said shaft and said discharge chamber for sealing the interior of the housing from said discharge chamber, means for restricting flow of oil along the wall of said bore and into the discharge chamber so that, as the shaft is rotated and pressure builds up within the gearbox above atmospheric pressure, oil entering the bore through the passages is slung radially outward to collect along the wall of the bore, and at least one of said passages serving as an outlet for the oil collected in the bore to direct the oil back to the interior of the housing said one passage having an inner end spaced radially outward of the inner ends of the other of said passages.

* * * * *